United States Patent
Nadella et al.

(10) Patent No.: US 10,301,446 B2
(45) Date of Patent: May 28, 2019

(54) METHOD FOR GENERATING A MICROSTRUCTURE IN A MATERIAL THAT INCLUDES THERMOPLASTIC POLYMER MOLECULES, AND RELATED SYSTEMS

(71) Applicants: DART CONTAINER CORPORATION, Mason, MI (US); THE UNIVERSITY OF WASHINGTON through its CENTER FOR COMMERCIALIZATION, Seattle, WA (US)

(72) Inventors: Krishna V. Nadella, Redmond, WA (US); Vipin Kumar, Seattle, WA (US); Huimin Guo, Seattle, WA (US)

(73) Assignees: Dart Container Corporation, Mason, MI (US); The University of Washington through its Center for Commercialization, Seattle, WA (US)

( * ) Notice: Subject to any disclaimer, the term of this patent is extended or adjusted under 35 U.S.C. 154(b) by 247 days.

(21) Appl. No.: 15/023,109

(22) PCT Filed: Sep. 19, 2014

(86) PCT No.: PCT/US2014/056658
§ 371 (c)(1),
(2) Date: Mar. 18, 2016

(87) PCT Pub. No.: WO2015/042468
PCT Pub. Date: Mar. 26, 2015

(65) Prior Publication Data
US 2016/0229973 A1    Aug. 11, 2016

Related U.S. Application Data

(60) Provisional application No. 61/880,004, filed on Sep. 19, 2013.

(51) Int. Cl.
*C08J 9/16* (2006.01)
*C08J 9/12* (2006.01)
(Continued)

(52) U.S. Cl.
CPC .............. *C08J 9/122* (2013.01); *B29B 13/00* (2013.01); *B29C 44/348* (2013.01);
(Continued)

(58) Field of Classification Search
CPC ................................................ C08J 2205/044
See application file for complete search history.

(56) References Cited

U.S. PATENT DOCUMENTS 5,684,055 A * 11/1997 Kumar ................ B29C 44/3446
264/176.1
6,005,013 A    12/1999 Suh et al.
(Continued)

FOREIGN PATENT DOCUMENTS

WO    2012157709 A1    11/2012
WO    2013106854 A1    7/2013

OTHER PUBLICATIONS

Kumar, V. "A Process for Making Microcellular Thermoplastic Parts" Polymer engineering and science, vol. 30, No. 20, Oct. 1990. (Year: 1990).*
European Search Report for Counterpart EP14845429.1, dated May 3, 2017.
International Search Report and Written Opinion for Counterpart PCT/US2015/056658, dated Dec. 19, 2014.

*Primary Examiner* — Michael M Dollinger
*Assistant Examiner* — Christina H Wales
(74) *Attorney, Agent, or Firm* — McGarry Bair PC

(57) ABSTRACT

A method for generating a microstructure that includes microcellular bubbles, in a material that includes molecules of a thermoplastic polymer, comprises: determining a size-index for the material that represents an average size of the thermoplastic polymer molecules included in the material, and in response to the determined size-index, setting a (Continued)

parameter of a process to generate a microstructure in the material that includes microcellular bubbles. The process to generate a microstructure in the material includes: 1) infusing into the material, during a first period, a gas that does not react with the material, 2) making the gas-infused material thermodynamically unstable.

10 Claims, 2 Drawing Sheets

(51) Int. Cl.
  *B29B 13/00* (2006.01)
  *B29C 44/34* (2006.01)
  *B29K 67/00* (2006.01)
  *B29K 101/12* (2006.01)
  *B29K 105/04* (2006.01)
  *B29K 105/00* (2006.01)

(52) U.S. Cl.
  CPC .... *B29C 44/3453* (2013.01); *B29K 2067/003* (2013.01); *B29K 2101/12* (2013.01); *B29K 2105/041* (2013.01); *B29K 2105/046* (2013.01); *B29K 2105/256* (2013.01); *C08J 2367/02* (2013.01)

(56) References Cited

U.S. PATENT DOCUMENTS

| | | | |
|---|---|---|---|
| 6,284,810 B1* | 9/2001 | Burnham | B29C 44/322 |
| | | | 264/45.9 |
| 6,555,590 B1* | 4/2003 | Tan | B29C 44/10 |
| | | | 264/50 |
| 7,807,260 B2* | 10/2010 | Nadella | B29C 44/3415 |
| | | | 428/316.6 |
| 8,568,125 B2 | 10/2013 | Branch et al. | |
| 2002/0177663 A1 | 11/2002 | Cahill | |
| 2004/0080070 A1 | 4/2004 | Liu et al. | |
| 2006/0189269 A1 | 8/2006 | Roy et al. | |
| 2006/0257606 A1 | 11/2006 | Branch et al. | |
| 2008/0176971 A1* | 7/2008 | Sugawara | C08F 10/06 |
| | | | 521/145 |
| 2008/0234443 A1 | 9/2008 | Kiss et al. | |
| 2009/0076216 A1 | 3/2009 | Kiss et al. | |
| 2009/0321974 A1 | 12/2009 | Branch et al. | |
| 2011/0180509 A1 | 7/2011 | Hutchinson et al. | |
| 2011/0251060 A1 | 10/2011 | Harrison et al. | |
| 2013/0140320 A1 | 6/2013 | Nadella et al. | |
| 2014/0088214 A1 | 3/2014 | Okamoto et al. | |

* cited by examiner

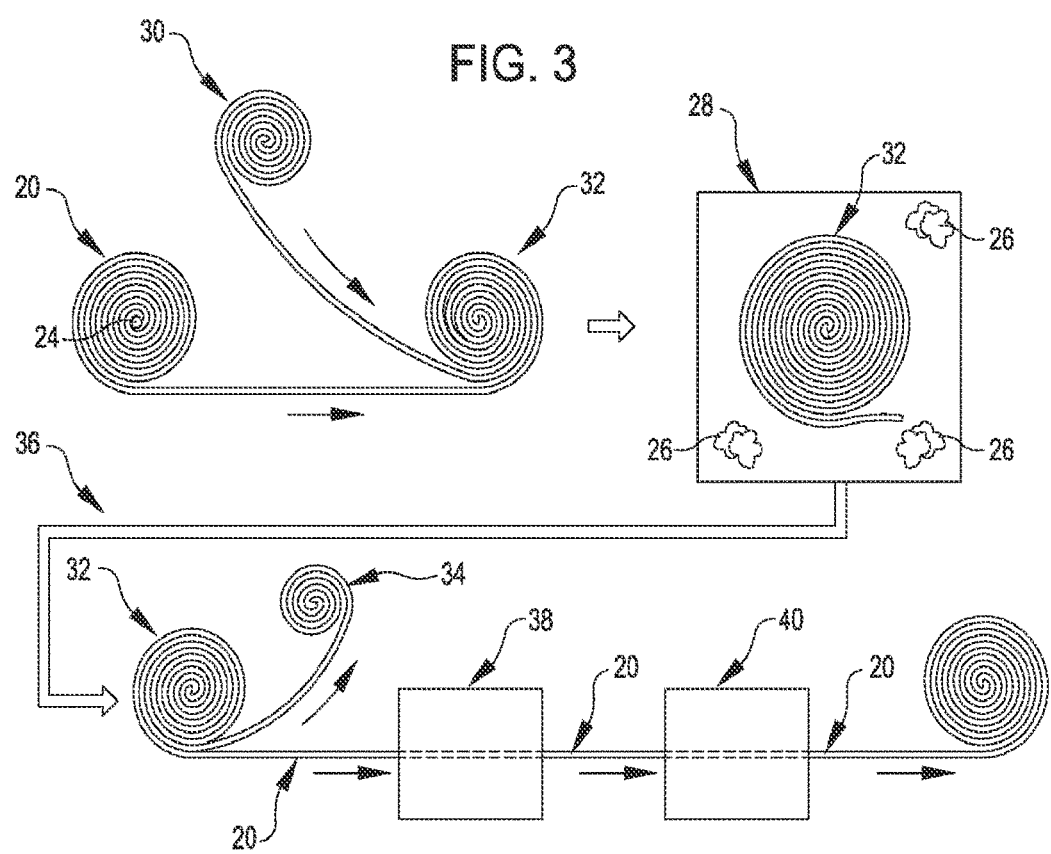

METHOD FOR GENERATING A MICROSTRUCTURE IN A MATERIAL THAT INCLUDES THERMOPLASTIC POLYMER MOLECULES, AND RELATED SYSTEMS

CROSS-REFERENCE TO RELATED APPLICATIONS

This application claims priority from International Application No. PCT/US2014/056658, filed 19 Sep. 2014, which claims priority from commonly owned U.S. Provisional Patent Application 61/880,004 filed 19 Sep. 2013, and titled "Effect of Intrinsic Viscosity on Solid-State Microcellular Foaming of Polyethylene Terephthalate (PET)", incorporated by reference.

BACKGROUND

Plastics are versatile materials in large part because they include carbon atoms as their backbone or base. Carbon can form stable bonds with other atoms, such as hydrogen and oxygen, to form a molecule that is monomer. Carbon can also form stable bonds with other carbon atoms while also being bonded to other atoms. In these situations the carbon in two or more monomer molecules may bond with each other to form a molecule that is a polymer. Such polymers can have any number of monomers bonded together. For example, some polymer molecules have three monomers and some polymer molecules have thousands of monomers that together form a molecule having a long chain of monomers. In either case, each of the polymers is a single molecule whose atoms are the same as the others, but whose mass and thus size is very different than the others. Because isolating or forming polymers having the same size is typically difficult and expensive to do, most plastic material includes many molecules/polymers whose atoms are the same but whose sizes are different. And, thus two plastic materials that are the same often do not have the same number and/or distribution of specific same-sized molecules.

This difference in the number and/or distribution of specific same-sized molecules can cause different lots of the same material processed in the same way to result in a product that is not the same. For most end products the difference in the product does not cause enough of a problem to warrant changing the size of the molecules before processing the material. But, for some end products the difference in the product may be significant, and the significance may be beneficial or detrimental depending on the intended use of the end product.

SUMMARY

In an aspect of the invention, a method for generating a microstructure that includes microcellular bubbles, in a material that includes molecules of a thermoplastic polymer, comprises: determining a size-index for the material that represents a size of the thermoplastic polymer molecules included in the material, and in response to the determined size-index, setting a parameter of a process to generate a microstructure in the material that includes microcellular bubbles. The process to generate a microstructure in the material includes: 1) infusing into the material, during a first period, a gas that does not react with the material, 2) making the gas-infused material thermodynamically unstable, during a second period, at a temperature close to or above the gas-infused material's glass-transition-temperature to nucleate and grow microcellular bubbles in the material, and 3) reducing the temperature of the gas-infused material to a temperature below the gas-infused material's glass-transition-temperature to stop the growth of the microcellular bubbles in the material.

By determining a size-index for the material that represents a size of the thermoplastic polymer molecules included in the material, one can more accurately predict how the material will respond to a process that generates bubbles in the material's microstructure. With a more accurate prediction of the material's response to such a process, one can set or change a parameter of the process to form a desired microstructure in the material. The desired microstructure may be different than the microstructure of the same material having a different size-index, to provide the material greater mechanical strength, or to provide the material greater thermal insulation. Likewise, the desired microstructure may be different than the same material having a different size-index to provide the material with a final thickness that would be the same as the final thickness of the different-size-index material after processing. That is, one can set or change a parameter of the process so that materials having different size-indices may be used to produce a consistently-sized material.

BRIEF DESCRIPTION OF THE FIGURES

FIG. 3 shows a schematic view of a process for generating a closed-cell microstructure in a material such as that shown in FIG. 2, according to an embodiment of the invention.

DETAILED DESCRIPTION

Figure 1:
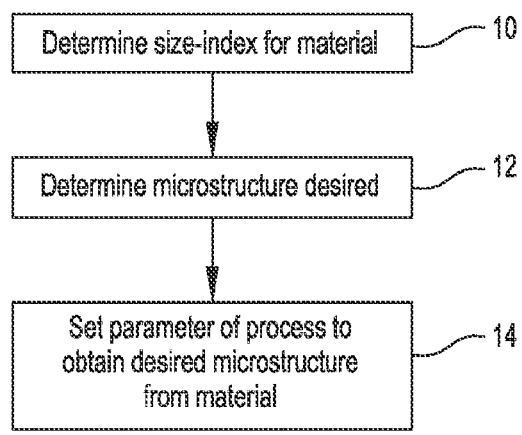
FIG. 1 shows a flow chart of a method for generating a microstructure that includes microcellular bubbles, in a material that includes molecules of a thermoplastic polymer, according to an embodiment of the invention.

FIG. 1 shows a flow chart of a method for generating a microstructure that includes microcellular bubbles, in a material that includes molecules of a thermoplastic polymer, according to an embodiment of the invention. The method includes determining a size-index (step 10 in FIG. 1) for the material that represents a size of the thermoplastic polymer molecules included in the material, and determining a desired microstructure and/or macrostructure (step 12 in FIG. 1) for the material after microcellular bubbles have been generated in the material. Then, in response to the determined size-index and desired microstructure and/or macrostructure, setting a parameter of a process (step 14 in FIG. 1) to generate a microstructure in the material that includes microcellular bubbles. The process to generate a microstructure in the material includes: 1) infusing into the material, during a first period, a gas that does not react with the material, 2) making the gas-infused material thermodynamically unstable, during a second period, at a temperature close to or above the gas-infused material's glass-transition-temperature to nucleate and grow microcellular bubbles in the material, and 3) reducing the temperature of the gas-infused material to a temperature below the gas-infused material's glass-transition-temperature to stop the growth of the microcellular bubbles in the material.

By determining a size-index for the material that represents an average size of the thermoplastic polymer molecules included in the material, one can more accurately predict how the material will respond to a process that generates bubbles in the material's microstructure. With a more accurate prediction of the material's response to such a process, one can set or change a parameter of the process to form a desired microstructure in the material. The desired microstructure may be different than the microstructure of the same material having a different size-index, to provide the material greater mechanical strength, or to provide the material greater thermal insulation. Likewise, the desired microstructure may be different than the same material having a different size-index to provide the material with a final thickness that would be the same as the final thickness of the different-size-index material after processing. That is, one can set or change a parameter of the process so that materials having different size-indices may be used to produce a consistently-sized material.

The material may be any desired material that includes molecules of a thermoplastic polymer. For example, in this and other embodiments the material is polyethylene terephthalate (PET) and includes many molecules of an ethylene polymer. In other embodiments, the material may be any amorphous or semi-crystalline material, such as polystyrene (PS) that includes many molecules of a styrene polymer, polycarbonate (PC) that includes many molecules of a carbonate polymer, and polypropylene (PP) that includes many molecules of a propylene polymer.

Figure 2:
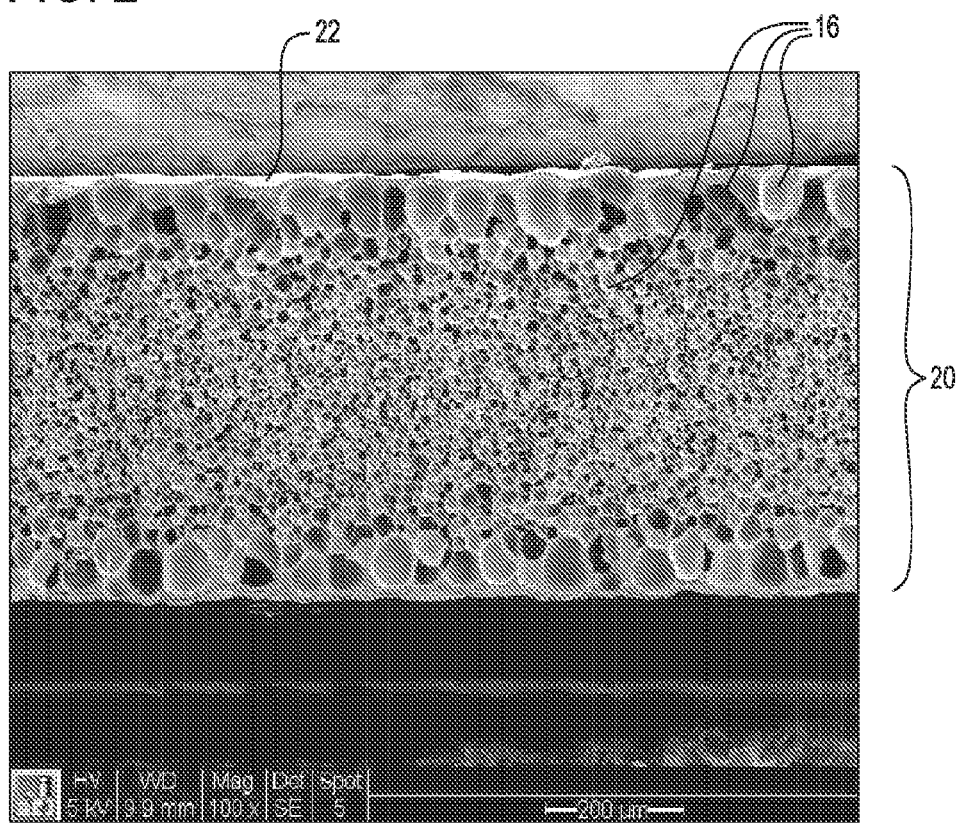
FIG. 2 is a photograph of a cross-section of a portion of a material having a microstructure that includes microcellular bubbles, according to an embodiment of the invention.

The microstructure and/or macrostructure of the material after the material is subjected to the process may be any desired microstructure and/or macrostructure that includes microcellular bubbles. Here the macrostructure of the material is different than the microstructure of the material. The macrostructure of the material refers to the structure of the material as a whole, such as thickness, width, length, and relative density which is the ratio of the density of the material after processing to the density of the material before processing. The microstructure of the material refers to the internal structure of the material. For example, as shown in FIG. 2, in this and other embodiments the microstructure of the material after processing includes many closed cells 16 (only 3 labeled in FIG. 2 for clarity)—about $10^8$ or more per cubic centimeter ($cm^3$). The size of each closed cell 16 ranges between 1 and 200 µm long at its maximum dimension that extends across the void. Because the geometry of each closed-cell is rarely, if at all, a perfect sphere, the size of each closed cell is arbitrarily identified as the length of the longest chord that extends through the void within the closed cell. For example, the size of an oblong cell would be the length of the longest chord that extends in the same direction as the cell's elongation, and the size of a sphere would be the length of the sphere's diameter.

The size-index may be any desired index that represents a size of the thermoplastic polymer molecules included in the material. For example, in this and other embodiments the size-index is the intrinsic viscosity of the material. As the length of the molecules' polymer chains get longer, the molecule's size increases and the material's intrinsic viscosity increases. For a material that has many different-sized molecules of a polymer, such as conventional PET, the intrinsic viscosity of the material represents an average size of the polymer molecules in the material. Intrinsic viscosity, which is measured in deciliters per gram (dL/g), is determined by extrapolating to zero concentration the relative viscosity of a solution of the material. The relative viscosity of a solution of the material is the ratio of the viscosity of the solvent alone that the material is dissolved in to the viscosity of the solution of the material using that solvent. So, by measuring the relative viscosity of different concentrations of the material solution, and then extrapolating the viscosities to a zero concentration of the material solution, one can determine the intrinsic viscosity of the material.

In other embodiments, the size-index may be a weighted average of the molecular weights of the polymer molecules in the material. More specifically, the size-index may be determined by multiplying a specific molecular weight of a molecule in the material by the total number of molecules having that specific molecular weight, and then adding the numbers calculated for each molecular weight found in the material. In still other embodiments, the size-index may be a number average of the molecular weights of the polymer molecules in the material. More specifically, the size-index may be determined by adding together the molecular weight of each polymer molecule in the material and then dividing this number by the total number of polymer molecules in the material. In still other embodiments, the size-index may be a combination of any of these.

Still referring to FIG. 1, the process for generating in the material a microstructure that includes microcellular bubbles includes at least three steps (each discussed in greater detail in conjunction with FIGS. 2 and 3). First, one exposes the material to a gas that does not react with the material, to infuse the gas into the material. One typically does this by placing for a period that may range from a few hours to many days the material in an atmosphere of the gas whose pressure is greater than ambient air pressure. After the material absorbs a desired amount of gas, one then nucleates bubbles in the material and allows them to grow to a desired size. One typically does this by holding for another period of time that may range from a few seconds to many hours the temperature of the gas-infused material close to or above its glass-transition-temperature while making the gas-infused material thermodynamically unstable. Then, when the bubbles have grown to a desired size, one stops their growth. One typically does this by cooling the gas infused material to a temperature below its glass-transition-temperature.

Between the end of the gas-infusion step and the beginning of the bubble nucleation step, the process may also include an additional step during which gas may migrate out of the gas-infused material. If the gas-infused material is exposed for a period to an atmosphere having less pressure than the atmosphere of gas in the first step, then gas may migrate out of the gas-infused material. During this period, the gas at the surface of the material leaves the material first, initially causing a significant loss of gas in the surface and immediately adjacent layers of the material. Then after a while, the gas from the interior of the material starts migrating out toward the surface of the material. If the gas-infused material is brought to or close to the glass-transition-temperature when the gas concentration is low in the surface and the immediately adjacent layers, then bubbles will not form on the surface and in the immediately adjacent layers. Thus the material's microstructure may include a skin (22 in FIG. 2) at the surface of the material that is solid and integral with the other portions of the material's microstructure.

The intrinsic viscosity of a material affects the material's response to the process for generating a microstructure that includes microcellular bubbles, and thus may also affect the processed material's macrostructure. For example, in this and other embodiments the intrinsic viscosity of PET material affects the number and size of the bubbles nucleated and grown in the material, as well as the skin thickness at the surface of the material. And because of this, the intrinsic viscosity of PET material also affects the macrostructure of the processed material. More specifically, when two chunks of PET material—one having an intrinsic viscosity of 0.68 dig and the other having an intrinsic viscosity of 0.81 dig—are subjected to the same process for generating a microstructure that includes microcellular bubbles, the microstructure of the PET material having a 0.81 dig intrinsic viscosity will have more, smaller microcellular bubbles and a thinner skin thickness than the microstructure of the PET material having a 0.68 dig intrinsic viscosity. And, the macrostructure of the PET material having a 0.81 dig intrinsic viscosity will have a thinner thickness and a higher relative density than the macrostructure of the PET material having a 0.68 dig intrinsic viscosity.

Thus, a material having a high intrinsic viscosity may be processed to include a microstructure whose mechanical properties, such as tensile strength, shear strength and compression strength, are better than the mechanical properties of a material having a lower intrinsic viscosity. And a material having a low intrinsic viscosity may be processed to include a thicker skin on the surface of the material, and may be more quickly and/or easily processed to include a desired macrostructure. For example, in this and other embodiments, a 0.031-inch thick sheet of PET material having an intrinsic viscosity of 0.58 dL/g was infused with a gas for thirty-six hours to produce a 0.060-inch thick sheet; but a 0.035-inch thick sheet of PET material having an intrinsic viscosity of 0.695 dL/g had to be infused with a gas for forty-two hours to produce a 0.060-inch thick sheet.

FIG. 2 is a photograph of a cross-section of a portion of a material 20 that includes molecules of a thermoplastic polymer. The material 20 has a microstructure that includes microcellular bubbles 16 and a skin 22, according to an embodiment of the invention. FIG. 3 is a schematic view of a process for generating a microstructure in the material such as that shown in FIG. 2, according to an embodiment of the invention. Although the process shown and discussed in conjunction with FIG. 3 is a semi-continuous process in which the material moves as its microstructure is generated, much like a car moving in an assembly line as the car is made, the process for forming the microstructure may not be semi-continuous. In such an example, the material may remain stationary as its microstructure is generated and only move from one processing station to another.

Referring to FIG. 3, in this and other embodiments, a process for generating a microstructure that includes microcellular bubbles 16 in a material 20 includes dissolving into the material 20 (here shown as a film rolled around a drum 24, but may be a block or thin sheet) a gas 26 that does not react with the material 20. The process also includes making the material 20 with the dissolved gas thermodynamically unstable at a temperature that is close to or above the polymer and dissolved gas combination's glass-transition-temperature—the temperature at which the material 20 is easily malleable but has not yet melted. With the temperature at or near the glass-transition-temperature, bubbles 16 (only three labeled in FIG. 2 for clarity) of the gas 26 can nucleate and grow in regions of the material 20 that are thermodynamically unstable—i.e. supersaturated. When the bubbles 16 have grown to a desired size, the temperature of the material 20 is reduced below the glass-transition-temperature to stop the bubbles' growth, and thus provide the material 20 with a microstructure having closed-cells whose size may range between 1 and 200 μm long.

In the process, the first step 28 is to dissolve into the material 20 any desired gas 26 that does not react with the material 20. For example, in this and certain other embodiments of the process, the gas 26 may be carbon dioxide ($CO_2$) because $CO_2$ is abundant, inexpensive, and does not react with PET. In other embodiments of the process, the gas may be nitrogen and/or helium. Dissolving the gas 26 into the material 20 may be accomplished by exposing the material for a period of time to an atmosphere of the gas 26 having a temperature and a pressure. The temperature, pressure, and period of time may be any desired temperature, pressure, and period of time to dissolve the desired amount of gas 26 into the material 20. The amount of gas 26 dissolved into the material 20 is directly proportional to the pressure of the gas 26 and the period of time that the material 20 is exposed to the gas 26 at a specific temperature and specific pressure, but is inversely proportional to the temperature of gas 26. For example, in this and certain other embodiments, the temperature may be 72° Fahrenheit, the pressure may be 725 pounds per square inch (psi), and the duration of the period may be 10 hours. This typically saturates the material 20 with the gas 26. In other embodiments, the pressure may range between 500 psi and 1000 psi, and the duration of the period may range between 4 hours and 24 hours.

Because the layers of the rolled material 20 that lie between adjacent layers or between a layer and the drum 24 are substantially unexposed to the atmosphere when the roll is placed in the atmosphere, a material 30 is interleaved between each layer of the rolled material that exposes each layer to the atmosphere. In this and certain other embodiments, the material 30 includes a sheet of cellulose, and is disposed between each layer of the material 20 by merging the sheet with the material 20 and then rolling the combination into a single roll 32. The material 30 exposes each layer of the material 20 by allowing the gas 26 to easily pass through it. After the gas 26 has saturated the material 20, the material 30 may be removed from the roll 32 and saved as a roll 34 for re-use.

The next step 36 in the process includes exposing the material 20 with the dissolved gas 26 to an atmosphere having less pressure than the one in the first step to cause the combination of the material 20 and the gas 26 dissolved in the material 20 to become thermodynamically unstable—i.e. the whole material 20 or regions of the material 20 to become supersaturated with the dissolved gas 26. For example, in this and certain other embodiments, the reduction in pressure may be accomplished by simply exposing the material 20 to atmospheric pressure, which is about 14.7 psi, in the ambient environment.

When the combination of the material 20 and the dissolved gas 26 becomes thermodynamically unstable, the dissolved gas tries to migrate out of the material 20 and into the ambient environment surrounding the material 20. Because the dissolved gas 26 in the interior regions of the material 20 must migrate through the regions of the material 20 that are closer to the material's surface to escape from the material 20, the dissolved gas 26 in the interior regions begins to migrate after the dissolved gas 26 in the surface regions begins to migrate, and takes more time to reach the ambient environment surrounding the material 20 than the dissolved gas 26 in the film's regions that is closer to the material's surface. Thus, before heating the material 20 to a temperature that is close or above its glass-transition-temperature, one can modify the concentration of dissolved gas 26 in regions of the material 20 by exposing the material 20 to an atmosphere having less pressure than the one in the first step for a period of time. Because the concentration of dissolved gas 26 depends on the amount of gas that escapes into the ambient environment surrounding the material 20, the concentration of dissolved gas 26 is inversely proportional to the period of time that material 20 is exposed to the low-pressure atmosphere before being heated close to or above its glass-transition-temperature.

In this manner, a skin, such as the skin 22 (FIG. 2), may be formed in the material 20 when the material 20 is heated to a temperature that is close to or above its glass-transition-temperature. For example, in this and certain other embodiments, the roll 32 of material 20 and interleaved material 30 can remain in a thermodynamically unstable state for a period of time before removing the material 30 from the roll 32 and heating the material 20. This allows some of the gas 26 dissolved in the region of the material 20 adjacent the material's surface to escape. With the gas 26 absent from this region of the material, this region becomes more thermodynamically stable than the regions that are further away from the material's surface. With an amount of thermodynamic stability in the region, bubbles won't nucleate in the region when the material 20 is heated close to or above its glass-transition-temperature. Consequently, closed cells 16 (FIG. 2) can be omitted from this region of the material, leaving a solid portion of the microstructure that is integral to the closed-cell portion of the microstructure, such as the skin 22 (FIG. 2). Because the thickness of the skin 22 or solid portion depends on the absence of dissolved gas 26 in the region of the material 20, the thickness of the skin 22 or solid portion is directly proportional to the period of time that the material 20 spends in a thermodynamically unstable state before being heated to or substantially close to its glass-transition-temperature. In this and certain other embodiments, the thickness of the integral skin 22 ranges 5-200 µm.

The next step 38 in the process is to nucleate and grow bubbles 16 (FIG. 2) in the material 20 to achieve a desired microstructure for the material 20. Bubble nucleation and growth begin about when the temperature of the material 20 is close to or above the glass-transition-temperature of the material 20 with the dissolved gas 26. The duration and temperature at which bubbles 16 are nucleated and grown in the material 20 may be any desired duration and temperature that provides the desired microstructure. For example, in this and certain other embodiments, the temperature that the PET polymer is heated to is approximately 200°-280° Fahrenheit, which is about 40°-120° warmer than the glass-transition-temperature of the material without any dissolved gas 26. The PET material 20 is held at approximately 200°-280° Fahrenheit for approximately 30 seconds. This provides a relative density of the material of about 18.5%. If the PET material 20 is held at 200°-280° Fahrenheit for a period longer than 30 seconds, such as 120 seconds, then the bubbles 16 grow larger. This may provide a relative density of the material of about 10%-20%. If the PET material 20 is held at 200°-280° Fahrenheit for a period shorter than 30 seconds, such as 10 seconds, then the bubbles 16 remain small. This may provide a relative density of the closed cell film of about 40%.

To heat the material 20 that includes the dissolved gas 26, one may use any desired heating apparatus. For example, in this and certain other embodiments, the PET material 20 may be heated by a roll fed flotation/impingement oven, disclosed in the currently pending U.S. patent application Ser. No. 12/423,790, titled ROLL FED FLOTATION/IMPINGEMENT AIR OVENS AND RELATED THERMOFORMING SYSTEMS FOR CORRUGATION-FREE HEATING AND EXPANDING OF GAS IMPREGNATED THERMOPLASTIC WEBS, filed 14 Apr. 2009, now U.S. Pat. No. 8,568,125, issued Oct. 29, 2013 and incorporated herein by this reference. This oven suspends and heats material that moves through the oven, without restricting the expansion of the film.

The next step 40 in the process includes reducing the temperature of the heated material 20, and thus the malleability of the material 20 that occurs at or near the glass-transition-temperature, to stop the growth of the bubbles 16. The temperature of the heated material may be reduced using any desired technique. For example, in this and certain other embodiments, the material 20 may be left to cool at ambient room temperature—i.e. simply removed from the heating apparatus. In other embodiments the heated material 20 may be quenched by drenching it with cold water, cold air, or any other desired medium.

Other embodiments of the process are possible. For example, the material 20 can be heated to a temperature that is close to or above its glass-transition-temperature when the material 20 is initially exposed to an atmosphere that causes the gas dissolved in the material 20 to become thermodynamically unstable. This allows one to make a film that does not include a skin or includes a skin having a minimal thickness.

Because the intrinsic viscosity of a material affects the material's response to the process for generating a microstructure that includes microcellular bubbles, such as the one discussed in conjunction with FIGS. 2 and 3, determining the material's intrinisic viscosity allows one to set or change one or more of the parameters of the process to obtain a desired microstructure. For example, in the process discussed in conjunction with FIGS. 2 and 3, one can increase or decrease the saturation period, the desorption period, and the bubble nucleation and growth period as desired to obtain a desired microstructure and/or macrostructure.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A method for generating a microstructure that includes microcellular bubbles, in a film, block, or sheet of material that includes molecules of a thermoplastic polymer, the method comprising:
   determining a size-index for the material that represents a size of the thermoplastic polymer molecules included in the material; and
   in response to the determined size-index, setting a parameter of a process to generate the microstructure in the material that includes microcellular bubbles, wherein the process includes:
      infusing into the material, during a first period, a gas that does not react with the material by exposing the material to the gas at a predetermined pressure for a predetermined period of time to allow the gas to infuse into the material;
      making the gas-infused material thermodynamically unstable, during a second period, at a temperature close to or above the gas-infused material's glass-transition-temperature to nucleate and grow microcellular bubbles in the material;
      reducing the temperature of the gas-infused material to a temperature below the gas-infused material's glass-transition-temperature to stop the growth of the microcellular bubbles in the material; and desorbing dissolved gas from an exterior region of the material during a third period to remove some of the gas dissolved in the material;

wherein setting a parameter of the process includes setting a duration of the third period; and wherein the desorbing dissolved gas from an exterior region of the material occurs prior to making the gas-infused material thermodynamically unstable in the second period at the temperature close to or above the gas-infused material's glass-transition-temperature.

2. A method for generating a microstructure that includes microcellular bubbles, in a film, block, or sheet of material that includes molecules of a thermoplastic polymer, the method comprising:

determining a size-index for the material that represents a size of the thermoplastic polymer molecules included in the material; and in response to the determined size-index, setting a parameter of a process to generate the microstructure in the material that includes microcellular bubbles, wherein the process includes:

infusing into the material, during a first period, a gas that does not react with the material by exposing the material to the gas at a predetermined pressure for a predetermined period of time to allow the gas to infuse into the material, wherein the first period has a duration of 36 hours;

making the gas-infused material thermodynamically unstable, during a second period, at a temperature close to or above the gas-infused material's glass-transition-temperature to nucleate and grow microcellular bubbles in the material;

reducing the temperature of the gas-infused material to a temperature below the gas-infused material's glass-transition-temperature to stop the growth of the microcellular bubbles in the material; and desorbing dissolved gas from an exterior region of the material during a third period to remove some of the gas dissolved in the material;

wherein setting a parameter of the process includes setting a duration of the third period; and wherein the material has a thickness of 0.031 inch before being processed to generate the microstructure that includes microcellular bubbles, the size-index for the material is an intrinsic viscosity of 0.56 dl/g (deciliter per gram), and the material has a thickness of 0.060 inch after the microstructure is generated in the material.

3. A method for generating a microstructure that includes microcellular bubbles, in a film, block, or sheet of material that includes molecules of a thermoplastic polymer, the method comprising:

determining a size-index for the material that represents a size of the thermoplastic polymer molecules included in the material; and in response to the determined size-index, setting a parameter of a process to generate the microstructure in the material that includes microcellular bubbles, wherein the process includes:

infusing into the material, during a first period, a gas that does not react with the material by exposing the material to the gas at a predetermined pressure for a predetermined period of time to allow the gas to infuse into the material, wherein the first period has a duration of 42 hours;

making the gas-infused material thermodynamically unstable, during a second period, at a temperature close to or above the gas-infused material's glass-transition-temperature to nucleate and grow microcellular bubbles in the material;

reducing the temperature of the gas-infused material to a temperature below the gas-infused material's glass-transition-temperature to stop the growth of the microcellular bubbles in the material; and desorbing dissolved gas from an exterior region of the material during a third period to remove some of the gas dissolved in the material;

wherein setting a parameter of the process includes setting a duration of the third period; and wherein the material has a thickness of 0.035 inch before being processed to generate the microstructure that includes microcellular bubbles, the size-index for the material is an intrinsic viscosity of 0.695 dl/g (deciliter per gram), and the material has a thickness of 0.060 inch after the microstructure is generated in the material.

4. The method of claim 1 wherein determining a size-index includes determining an intrinsic viscosity for the material.

5. The method of claim 1 wherein setting a parameter of the process includes setting the duration of the first period that gas is dissolved into the material.

6. The method of claim 1 wherein setting a parameter of the process includes setting the duration of the second period that the gas-infused material is thermodynamically unstable at or above the gas-infused material's glass-transition-temperature.

7. The method of claim 1 wherein setting a parameter of the process includes:

setting the duration of the first period that gas is dissolved into the material; and setting the duration of the second period that the gas-infused material is thermodynamically unstable at or above the gas-infused material's glass-transition-temperature.

8. The method of claim 1 wherein the thermoplastic polymer molecules are at least one of the following: polyethylene terephthalate (PET), polystyrene, polycarbonate, acrylonitrile-butadiene-styrene, glycol modified PET, polyethylene, polypropylene, a blend of polyphenylene oxide and polystyrene, polyvinyl chloride, or crystallizable PET (CPET).

9. The method of claim 1 wherein determining a size-index includes determining at least one of a weighted average of the molecular weight of the material, a number average of the molecular weight of the material, or both.

10. The method of claim 1 wherein the setting a duration of the third period is based on forming a skin having a predetermined thickness.

* * * * *